(12) United States Patent
Shiino

(10) Patent No.: US 10,252,747 B2
(45) Date of Patent: Apr. 9, 2019

(54) ROTATIONAL ANGLE DETECTION APPARATUS AND POWER STEERING APPARATUS

(71) Applicant: HITACHI AUTOMOTIVE SYSTEMS, LTD., Hitachinaka-shi, Ibaraki (JP)

(72) Inventor: Kohtaro Shiino, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 135 days.

(21) Appl. No.: 15/533,419

(22) PCT Filed: Dec. 7, 2015

(86) PCT No.: PCT/JP2015/084265
§ 371 (c)(1),
(2) Date: Jun. 6, 2017

(87) PCT Pub. No.: WO2016/098627
PCT Pub. Date: Jun. 23, 2016

(65) Prior Publication Data
US 2017/0349211 A1 Dec. 7, 2017

(30) Foreign Application Priority Data

Dec. 16, 2014 (JP) ................. 2014-254425

(51) Int. Cl.
*B62D 15/02* (2006.01)
*B62D 5/04* (2006.01)
(Continued)

(52) U.S. Cl.
CPC ........... *B62D 15/0235* (2013.01); *B62D 5/04* (2013.01); *B62D 5/0421* (2013.01); *G01B 7/30* (2013.01);
(Continued)

(58) Field of Classification Search
CPC .... B62D 15/0235; B62D 5/04; B62D 5/0421; B62D 5/0454; G01B 7/30; G01D 5/145; G01D 5/20; G01D 5/245; G01D 5/2451
(Continued)

(56) References Cited

U.S. PATENT DOCUMENTS 8,942,890 B2 * 1/2015 Ura ........................ B62D 6/10
701/41
8,988,068 B2 * 3/2015 Ludwig .................. G01D 5/145
324/207.25
(Continued)

FOREIGN PATENT DOCUMENTS

| JP | 2010-038765 A | 2/2010 |
| JP | 2011-058870 A | 3/2011 |
| JP | 2013-007731 A | 1/2013 |

OTHER PUBLICATIONS

JP 2010/038765 A, Takada Yasuo, Feb. 18, 2010, (Machine Translation).*

*Primary Examiner* — Kevin Hurley
*Assistant Examiner* — Felicia L. Brittman
(74) *Attorney, Agent, or Firm* — Foley & Lardner LLP

(57) ABSTRACT

An object of the present invention is to provide a rotational angle detection apparatus and a power steering apparatus capable of detecting a rotational angle of a rotational shaft eve when a failure has occurred in a magnetic detection portion. One aspect of the present invention is a rotational angle detection apparatus including a first magnetic detection portion provided on a rotational axis and configured to detect a change in a magnitude or a direction of a magnetic field, and a second magnetic detection portion provided on the rotational axis and disposed at a position offset from the first magnetic detection portion in a direction along the rotational axis. The second magnetic detection portion is configured to detect the change in the magnitude or the
(Continued)

direction of the magnetic field. The rotational angle detection apparatus further includes a magnet provided on an outer side in a radial direction of the rotational axis with respect to the first magnetic detection portion and the second magnetic detection portion and disposed in such a manner that an N-pole and an S-pole face each other around the rotational axis. The magnet is provided rotatably relative to the first magnetic detection portion and the second magnetic detection portion. The rotational angle detection apparatus is configured to detect a rotational angle of the magnet relative to the first magnetic detection portion and the second magnetic detection portion based on signals output from the first magnetic detection portion and the second magnetic detection portion.

20 Claims, 7 Drawing Sheets

(51) Int. Cl.
*G01D 5/245* (2006.01)
*G01B 7/30* (2006.01)
*G01D 5/14* (2006.01)
*G01D 5/20* (2006.01)

(52) U.S. Cl.
CPC .............. *G01D 5/145* (2013.01); *G01D 5/20* (2013.01); *G01D 5/245* (2013.01); *G01D 5/2451* (2013.01); *B62D 5/0454* (2013.01); *B62D 5/0463* (2013.01)

(58) Field of Classification Search
USPC ........................................................ 180/443
See application file for complete search history.

(56) References Cited

U.S. PATENT DOCUMENTS

2010/0176799 A1 7/2010 Ausserlechner
2012/0146630 A1 6/2012 Itomi

* cited by examiner

ROTATIONAL ANGLE DETECTION APPARATUS AND POWER STEERING APPARATUS

TECHNICAL FIELD

The present invention relates to a rotational angle detection apparatus and a power steering apparatus.

BACKGROUND ART

As this kind of technique, there is disclosed a technique discussed in the following patent literature, PTL. PTL 1 discloses a technique including a sensor magnet rotatable integrally with a rotational shaft of a motor and a magnetic sensor disposed so as to face the sensor magnet. The magnetic sensor detects a rotational angle of the rotational shaft by detecting a change in a magnetic force due to a rotation of the rotational shaft.

CITATION LIST

Patent Literature

PTL 1: Japanese Patent Application Public Disclosure No. 2013-007731

SUMMARY OF INVENTION

Technical Problem

The technique discussed in PTL 1 includes only one magnetic sensor, and therefore may be unable to drive the motor if a failure has occurred in the magnetic sensor.

The present invention has been made focusing on the above-described drawback, and an object thereof is to provide a rotational angle detection apparatus and a power steering apparatus capable of detecting a rotational angle of a rotational shaft even when a failure has occurred in a magnetic detection portion.

Solution To Problem

To achieve the above-described object, according to a first aspect of the present invention, a rotational angle detection apparatus includes a first magnetic detection portion provided on a rotational axis and configured to detect a change in a magnitude or a direction of a magnetic field, and a second magnetic detection portion provided on the rotational axis and disposed at a position offset from the first magnetic detection portion in a direction along the rotational axis. The second magnetic detection portion is configured to detect the change in the magnitude or the direction of the magnetic field. The rotational angle detection apparatus further includes a magnet provided on an outer side in a radial direction of the rotational axis with respect to the first magnetic detection portion and the second magnetic detection portion and disposed in such a manner that an N-pole and an S-pole face each other around the rotational axis. The magnet is provided rotatably relative to the first magnetic detection portion and the second magnetic detection portion. The rotational angle detection apparatus is configured to detect a rotational angle of the magnet relative to the first magnetic detection portion and the second magnetic detection portion based on signals output from the first magnetic detection portion and the second magnetic detection portion.

Further, according to a second aspect of the present invention, a rotational angle detection apparatus includes a sensor rotor provided at a rotational body and serving as a detection target portion made from a magnetic material. The sensor rotor is formed in such a manner that an outer diameter thereof, which is a distance between an outer peripheral edge of the detection target portion and a rotational axis of the rotational body, or an inner diameter, which is a distance between an inner peripheral edge of the detection target portion and the rotational axis of the rotational body, periodically changes in a direction extending around the rotational axis. The rotational angle detection apparatus further includes a first detection portion provided on an inner peripheral side or an outer peripheral side of the sensor rotor and configured to detect a strength of a magnetic field, and a second detection portion provided on a same side as one of the inner peripheral side and the outer peripheral side of the sensor rotor where the first detection portion is provided and configured to detect the strength of the magnetic field. The rotational angle detection apparatus is configured to detect a rotational angle of the sensor rotor relative to the first detection portion and the second detection portion by detecting a change in the strength of the magnetic field according to the change in the outer diameter or the inner diameter periodically changing in the direction extending around the rotational axis based on a signal output from the first detection portion and a signal output from the second detection portion.

Further, according to a third aspect of the present invention, a power steering apparatus includes an angle detector configured to detect an angle of an output shaft of an electric motor configured to supply a steering force to a steering mechanism. The angle detector includes a first magnetic detection portion provided on a rotational axis and configured to detect a change in a magnitude or a direction of a magnetic field, and a second magnetic detection portion provided on the rotational axis and disposed at a position offset from the first magnetic detection portion in a direction along the rotational axis. The second magnetic detection portion is configured to detect the change in the magnitude or the direction of the magnetic field. The angle detector further includes a magnet provided at the output shaft of the electric motor and disposed on an outer side in a radial direction of the rotational axis with respect to the first magnetic detection portion and the second magnetic detection portion. The magnet is disposed in such a manner that an N-pole and an S-pole face each other around the rotational axis. The magnet is provided rotatably relative to the first magnetic detection portion and the second magnetic detection portion. The angle detector is configured to detect a rotational angle of the magnet relative to the first magnetic detection portion and the second magnetic detection portion based on signals output from the first magnetic detection portion and the second magnetic detection portion.

Advantageous Effects of Invention

The rotational angle detection apparatus according to the first aspect of the present invention can detect the rotational angle of the rotational shaft even when a failure has occurred in one of the first magnetic detection portion and the second magnetic detection portion.

Further, the rotational angle detection apparatus according to the second aspect of the present invention can detect the rotational angle of the rotational shaft even when a failure has occurred in one of the first detection portion and the second detection portion.

Further, the power steering apparatus according to the third aspect of the present invention can detect the rotational angle of the rotational shaft even when a failure has occurred in one of the first magnetic detection portion and the second magnetic detection portion.

DESCRIPTION OF EMBODIMENTS

First Embodiment

[Overall Configuration of Power Steering Apparatus]

Figure 1:
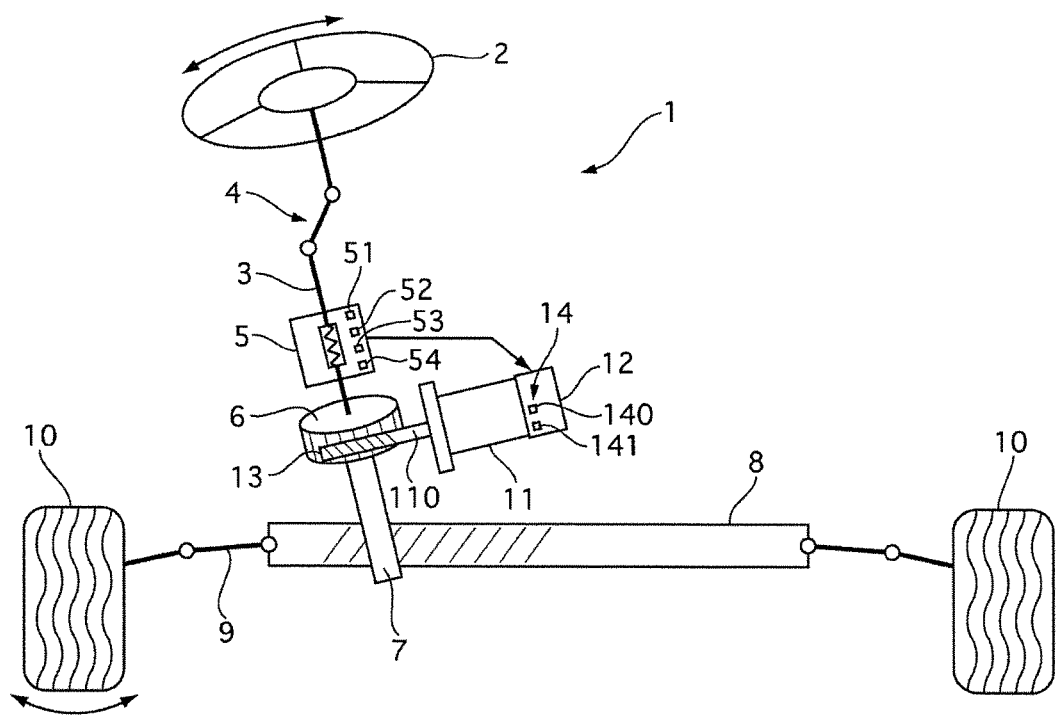
FIG. 1 illustrates an overall configuration of an electric power steering apparatus according to a first embodiment.

FIG. 1 illustrates an overall configuration of an electric power steering apparatus 1.

The electric power steering apparatus 1 includes a steering wheel 2, a wheel turning shaft 3, a pinion 7, a rack 8, and a tie rod 9. A steering operation performed by a driver is input to the steering wheel 2. The wheel turning shaft 3 is connected to the steering wheel 2. The pinion 7 rotates integrally with the wheel turning shaft 3. The rack 8 is meshed with the pinion 7 and converts the rotational movement of the pinion 7 into a linear movement. The tie rod 9 transmits the movement of the rack 8 to a turning target wheel 10. These components form a steering mechanism 4 that transmits the steering operation input to the steering wheel 2 to the turning target wheel 10.

Further, a torque sensor 5 and a worm wheel 6 are provided at the wheel turning shaft 3. The torque sensor 5 detects a steering torque input to the steering wheel 2. The worm wheel 6 rotates integrally with the wheel turning shaft 3. A worm shaft 13 is meshed with the worm wheel 6. The worm shaft 13 is connected to a driving shaft 110 of an electric motor 11 that provides an assist force for assisting a steering force. The electric motor 11 is a three-phase brushless motor, and is controlled by a motor control unit 12. The motor control unit 12 controls the steering force to be supplied from the electric motor 11 according to the steering torque detected by the torque sensor 5 and a driving state of a vehicle such as a vehicle speed.

A torsion bar 50 is provided at the torque sensor 5. The torsion bar 50 relatively rotatably couples a steering wheel 2 side and a pinion 7 side of the wheel turning shaft 3 with each other. Four hall ICs 51 to 54 are provided at the torque sensor 5. The hall ICs 51 to 54 each detect an amount of the relative rotation between the steering wheel 2 side and the pinion 7 side of the wheel turning shaft 3. A signal detected by each of the hall ICs 51 to 54 is transmitted to the motor control unit 12.

[Configuration of Motor Control Unit]

Figure 2:
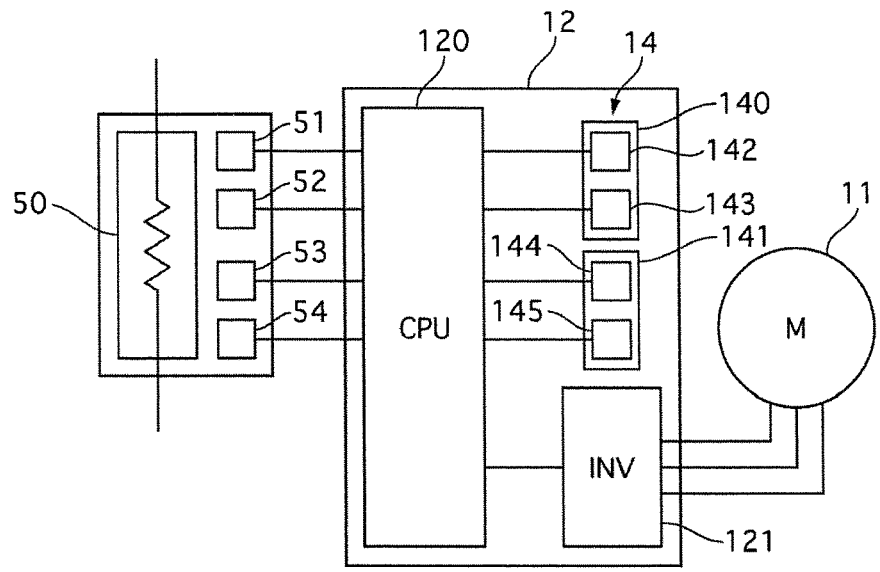
FIG. 2 illustrates a configuration of a motor control unit according to the first embodiment.

FIG. 2 illustrates a configuration of the motor control unit 12. The motor control unit 12 includes a central processing unit 120, an inverter 121, and a rotational angle sensor 14. The central processing unit 120 calculates a driving instruction signal directed to the electric motor 11 based on various kinds of information. The inverter 121 controls power to be supplied to the electric motor 11 based on the driving instruction signal of the central processing unit 120. The rotational angle sensor 14 detects a rotational angle of the driving shaft 110 of the electric motor 11.

The rotational angle sensor 14 includes two magnetic sensor chips (a first magnetic sensor chip 140 and a second magnetic sensor chip 141). Two magnetic detection elements 142 and 143 are mounted on the first magnetic sensor chip 140, and two magnetic detection elements 144 and 145 are mounted on the second magnetic sensor chip 141. In other words, the first magnetic sensor chip 140 and the second magnetic sensor chip 141 are each configured as a multi-sensor chip. The sensor element may be any sensor element that detects a magnitude and/or a direction of a magnetic field. Examples thereof include a magnetoresistive element and a Hall element, but are not especially limited thereto.

[Configuration of Rotational Angle Sensor]

Figure 3:
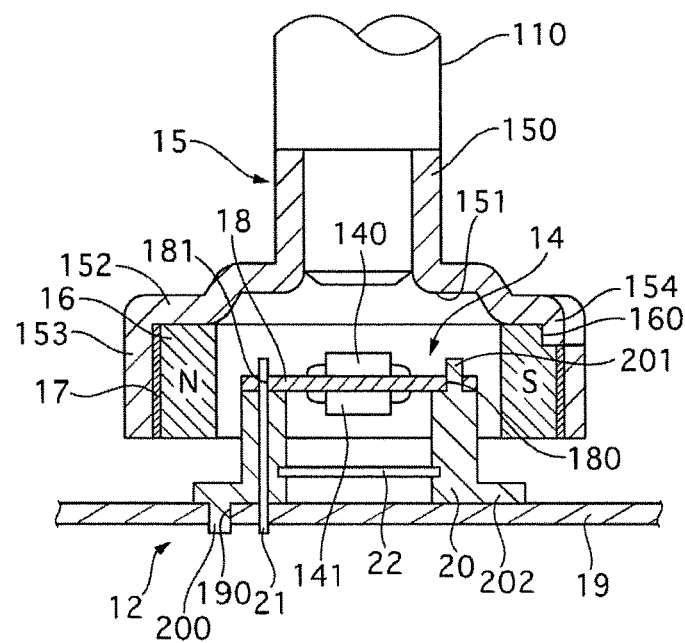
FIG. 3 schematically illustrates a configuration of a rotational angle sensor according to the first embodiment.

FIG. 3 schematically illustrates a configuration of the rotational angle sensor 14. A yoke member 15 made from a magnetic material is fixed to the driving shaft 110 of the electric motor 11 integrally rotatably with the driving shaft 110 by press-fitting. A cylindrical press-fitting recessed portion 150 is formed at one end side of the yoke member 15 in the axial direction. A distal end of the driving shaft 110 is inserted in an inner periphery of the press-fitting recessed portion 150. An abutment portion 151 is formed so as to extend in a radial direction from another end side of the press-fitting recessed portion 150 in the axial direction. A surface of the abutment portion 151 on the other end side in the axial direction is formed into a flat surface approximately perpendicular to the axial direction. When the yoke member 15 is press-fitted to the driving shaft 110, the yoke member 15 is pressed with a tool brought into abutment with this abutment portion 151.

An increased diameter portion 152 is formed so as to extend further in the radial direction from the abutment portion 151. A magnet holding portion 153 is formed so as to extend from a outermost portion of the increased diameter portion 152 in the radial direction toward the other end side in the axial direction. A cylindrical magnet 16 is held on an inner peripheral side of the magnet holding portion 153. In other words, the magnet holding portion 153 is provided on an outer side of the magnet 16 in the radial direction. The magnet 16 is fixed to the magnet holding portion 153 with use of an elastic adhesive agent 17. The magnet 16 is disposed so as not to overlap the abutment portion 151 in the radial direction.

Figure 4:
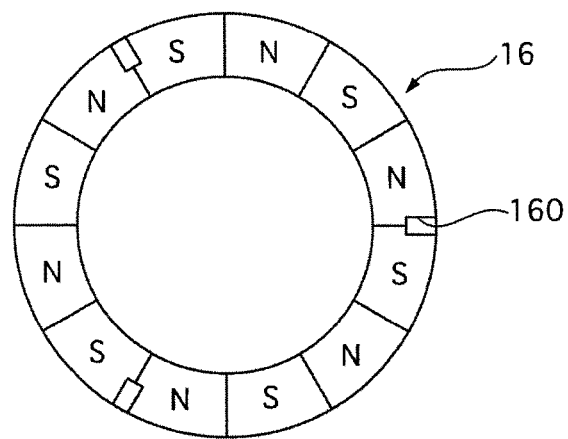
FIG. 4 schematically illustrates a magnet according to the first embodiment as viewed from an axial direction.

FIG. 4 schematically illustrates the magnet 16 from the axial direction. The magnet 16 includes N-poles and S-poles disposed so as to be arranged annularly alternately. The magnet 16 is formed so as to have a larger inner diameter than an outer diameter of the abutment portion 151 of the yoke member 15. In other words, the magnet 16 is provided in such a manner that the magnet 16 and the abutment portion 151 do not contact with each other and also do not overlap each other in the radial direction.

A plurality of cutout portions 160 (three cutout portions 160 in FIG. 4) is formed at the magnet 16. The magnet 16 is deformed so as to allow an inner peripheral surface of the yoke member 15 to enter the cutout portions 160 at positions corresponding to the cutout portions 160 of the yoke member 15. This arrangement regulates a rotation of the magnet 16 relative to the yoke member 15, and the deformed portions form a rotation regulation portion 154.

Figure 5:
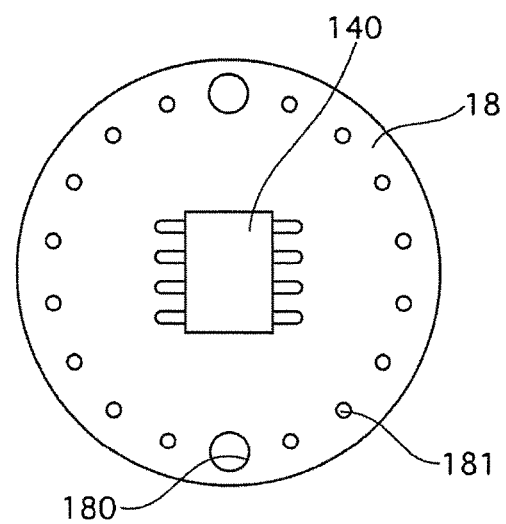
FIG. 5 schematically illustrates a sensor mounting substrate according to the first embodiment as viewed from one side in the axial direction.

A sensor mounting substrate 18 with the first magnetic sensor chip 140 and the second magnetic chip 141 mounted thereon is provided in an inner peripheral side of the magnet 16. FIG. 5 schematically illustrates the sensor mounting substrate 18 as viewed from one side in the axial direction. The sensor mounting substrate 18 is disposed at a position overlapping the magnet 16 in the axial direction. The sensor mounting substrate 18 is formed into a disk shape. The sensor mounting substrate 18 is disposed inside the magnet 16 coaxially with a center of an inner peripheral surface of the magnet 16. The first magnetic sensor chip 140 is mounted in proximity to a central portion of a surface of the sensor mounting substrate 18 on the one side in the axial direction. The second magnetic sensor chip 141 is mounted in proximity to a central portion of a surface of the sensor mounting substrate 18 on the other side in the axial direction. In other words, the first magnetic sensor chip 140 and the second magnetic sensor chip 141 are provided at offset positions from each other in the axial direction.

The sensor mounting substrate 18 is supported by a support member 20 fixed to a substrate 19 with the central processing unit 120 and the like mounted thereon. The support member 20 is made from an insulating material. An outer appearance of the support member 20 is generally formed into a cylindrical shape. A flange portion 202 extending in the radial direction is formed at an end of the support member 20 on the other side in the axial direction.

The support member 20 supports the sensor mounting substrate 18 in a state spaced apart from the substrate 19 toward the magnet 16 side. A position of the support member 20 relative to the substrate 19 is determined by insertion of a positioning pin 200 provided at the flange portion 202 of the support member 20 through a positioning hole 190 of the substrate 19. A position of the sensor mounting substrate 18 relative to the support member 20 is determined by insertion of a positioning pin 201 provided on a surface of the support member 20 on the sensor mounting substrate 18 side through a positioning hole 180 of the sensor mounting substrate 18.

The sensor mounting substrate 18 and the substrate 19 are electrically connected to each other via bus bars 21. The bus bars 21 are molded inside the support member 20, and the support member 20 also has a function as a bus bar mold. The bus bars 21 are inserted through bus bar through-holes 181 formed at the sensor mounting substrate 18, respectively. Sixteen bus bars 21 are provided in correspondence with eight legs of the first magnetic sensor chip 140 and eight legs of the second magnetic sensor chip 141. The bus bar through-holes 181, and the legs of the first magnetic sensor chip 140 and the second magnetic sensor chip 141 are connected to each other via wirings on the sensor mounting substrate 18.

A magnetic shielding plate 22 is provided between the sensor mounting substrate 18 and the substrate 19. The magnetic shielding plate 22 is a plate member made from a magnetic material. The magnetic shielding plate 22 is held by the support member 20. The magnetic shielding plate 22 is provided so as to overlap at least the first magnetic sensor chip 140 and the second magnetic sensor chip 141 as viewed from the axial direction. One sides of the first magnetic sensor chip 140 and the second magnetic sensor chip 141 in the axial direction and outer sides thereof in the radial direction are covered with the yoke member 15 made from the magnetic material, and other sides of the first magnetic sensor chip 140 and the second magnetic sensor chip 141 in the axial direction are covered with the magnetic shielding plate 22 also made from the magnetic material. This configuration can prevent or reduce application of an external magnetic force (a magnetic force other than the magnet 16) to the first magnetic sensor chip 140 and the second magnetic sensor chip 141.

[Functions]

The electric power steering apparatus 1 has been facing a demand requesting a capability of, even when a failure has occurred in a part of the system, maintaining similar control to the control before the occurrence of the failure. Supposing that a failure has occurred in the rotational angle sensor 14, dual systems can determine that the failure has occurred but cannot determine in which system the failure has occurred, thereby failing to maintain the similar control to the control before the occurrence of the failure. Therefore, the satisfaction of this demand requires provision of triple or more systems.

Currently, some power steering apparatus includes two magnetic detection elements mounted on one chip. However, even if the chip with the two magnetic detection elements mounted thereon is employed, two or more chips should be used to realize the triple or more systems. However, this configuration may lead to a difference in the direction and/or the magnitude of the detected magnetic field depending on a layout of the chips.

Therefore, the first embodiment is configured in such a manner that the first magnetic sensor chip 140 and the second magnetic sensor chip 141 are disposed offset in the axial direction of the driving shaft 110 of the electric motor 11. Further, the first embodiment is configured in such a manner that the magnet 16 is disposed in the outer peripheral side of the first magnetic sensor chip 140 and the second magnetic sensor chip 141. As a result, both the first magnetic sensor chip 140 and the second magnetic sensor chip 141 can detect the magnetic field in proximity of the rotational center of the driving shaft 110, which allows both the chips to exhibit uniform output characteristics.

Even in the case where the dual systems are constructed with use of two chips each including one magnetic detection element mounted thereon, employing a similar configuration allows the two chips to exhibit uniform output characteristics.

Further, in the first embodiment, the yoke member 15 made from the magnetic material is provided outside of the magnet 16 in the radial direction. As a result, the first embodiment can enhance the magnetic field of the magnet 16.

Further, the first embodiment is configured in such a manner that the magnet 16 is held by the yoke member 15. The yoke member 15 can also be used as a magnet holder, which can reduce the number of parts.

Further, the first embodiment is configured in such a manner that the magnet 16 is fixed to the yoke member 15 with use of the elastic adhesive agent 17. As a result, the first embodiment can absorb a difference in a linear expansion coefficient between the magnet 16 and the yoke member 15 with the aid of the adhesive agent 17.

Further, in the first embodiment, the yoke member 15 is equipped with the rotation regulation portion 154 that regulates the rotation of the magnet 16 relative to the yoke member 15. As a result, the first embodiment can regulate the rotation of the magnet 16 relative to the yoke member 15, and therefore can prevent or reduce deterioration of an accuracy of the detection of the rotational angle by the rotational angle sensor 14.

Further, the first embodiment is configured in such a manner that the cylindrical press-fitting recessed portion 150 is formed at the yoke member 15, and the distal end of the driving shaft 110 is press-fitted in the inner periphery of the press-fitting recessed portion 150. The first embodiment is configured in such a manner that the abutment portion 151 is formed so as to extend from the press-fitting recessed portion 150 in the radial direction, and the abutment portion 151 is kept out of contact with the magnet 16. The first embodiment is configured in such a manner that, when the yoke member 15 is press-fitted to the driving shaft 110, the yoke member 15 is pressed with the tool brought into abutment with this abutment portion 151. As a result, the abutment portion 151 serves as a pressing surface when the driving shaft 110 is press-fitted into the press-fitting recessed portion 150, which can facilitate a press-fitting process. Further, at the time of the press-fitting process, damage of the magnet 16 can be prevented or reduced.

Further, in the first embodiment, the sensor mounting substrate 18 with the first magnetic sensor chip 140 and the second magnetic sensor chip 141 mounted thereon is provided in the inner peripheral side of the magnet 16. The sensor mounting substrate 18 is disposed at the position overlapping the magnet 16 in the axial direction. As a result, the first magnetic sensor chip 140 and the second magnetic sensor chip 141 can be disposed in the inner peripheral side of the magnet 16 with the first magnetic sensor chip 140 and the second magnetic sensor chip 141 mounted on the sensor mounting substrate 18.

Further, the first embodiment is configured in such a manner that the first magnetic sensor chip 140 is mounted on the one side of the sensor mounting substrate 18 and the second magnetic sensor chip 141 is mounted on the other side of the sensor mounting substrate 18. As a result, the first magnetic sensor chip 140 and the second magnetic sensor chip 141 can be easily mounted on the sensor mounting substrate 18 while being disposed on a same rotational axis. Further, the first embodiment is configured in such a manner that the sensor mounting substrate 18 is formed into the disk-like shape, and the sensor mounting substrate 18 is disposed inside the magnet 16 coaxially with the center of the inner peripheral surface of the magnet 16. As a result, the first embodiment can achieve an increase in an area of the sensor mounting substrate 18 where the elements are mounted while preventing interference between the sensor mounting substrate 18 and the magnet 16.

Further, the first embodiment is configured in such a manner that the sensor mounting substrate 18 is supported while being spaced apart from the substrate 19 toward the magnet 16 side by the support member 20. As a result, the first embodiment can stably hold the sensor mounting substrate 18.

Further, in the first embodiment, the first magnetic sensor chip 140 and the second magnetic sensor chip 141 are provided so as to overlap the magnet 16 in the direction along the rotational axis. As a result, the first magnetic sensor chip 140 and the second magnetic sensor chip 141 can be disposed in a range where a strong magnetic field is generated between the N-pole and the S-pole of the magnet 16, which can improve the accuracy with which the rotational angle of the electric motor 11 is detected.

Further, the first embodiment is configured in such a manner that the magnet 16 is annularly formed. As a result, the first embodiment allows the magnet 16 to surround the outer peripheries of the first magnetic sensor chip 140 and the second magnetic sensor chip 141. Therefore, the first embodiment can prevent or reduce an influence from an external magnetic field on the first magnetic sensor chip 140 and the second magnetic sensor chip 141.

Further, in the first embodiment, the magnet 16 is formed in such a manner that the N-poles and the S-poles are annularly alternately disposed. As a result, the first embodiment allows the magnet 16 to surround the peripheries of the magnetic detection elements 142 and 143 and the magnetic detection elements 144 and 145 without complicating the shape of the magnet 16.

[Advantageous Effects]

(1) The rotational sensor 14 (a rotational angle detection apparatus), which is configured to detect the rotational angle of the electric motor 11 (a rotational body), includes the magnetic detection elements 142 and 143 (a first magnetic detection portion) provided on the rotational axis and configured to detect the change in the magnitude or the direction of the magnetic field, and the magnetic detection elements 144 and 145 (a second magnetic detection portion) provided on the rotational axis and disposed at the position offset from the magnetic detection elements 142 and 143 (the first magnetic detection portion) in the direction along the rotational axis. The magnetic detection elements 144 and 145 are configured to detect the change in the magnitude or the direction of the magnetic field. The rotational angle sensor 14 further includes the magnet 16 provided in the outer side in the radial direction of the rotational axis with respect to the magnetic detection elements 142 and 143 and the magnetic detection elements 144 and 145 and disposed in such a manner that the N-poles and the S-poles face each other around the rotational axis. The magnet 16 is provided rotatably relative to the magnetic detection elements 142 and 143 and the magnetic detection elements 144 and 145. The rotational angle sensor 14 is configured to detect the rotational angle of the magnet 16 relative to the magnetic detection elements 142 and 143 and the magnetic detection elements 144 and 145 based on the signals output from the magnetic detection elements 142 and 143 and the magnetic detection elements 144 and 145.

Therefore, the first embodiment allows both the magnetic detection elements 142 and 143 and the magnetic detection elements 144 and 145 to exhibit the uniform output characteristics.

(2) The yoke member 15 made from the magnetic material is provided outside of the magnet 16 in the radial direction.

Therefore, the first embodiment can enhance the magnetic field of the magnet 16.

(3) The yoke member 15 is formed so as to hold the magnet 16.

Therefore, the first embodiment can achieve a reduction in the number of parts.

(4) The elastic adhesive agent 17 (an elastic member) is provided between the magnet 16 and the yoke member 15.

Therefore, the first embodiment can absorb the difference in the linear expansion coefficient between the magnet 16 and the yoke member 15 by the adhesive agent 17.

(5) The yoke member 15 is equipped with the rotation regulation portion 154 configured to regulate the rotation of the magnet 16 relative to the yoke member 15.

Therefore, the first embodiment can prevent or reduce the deterioration of the accuracy of the detection of the rotational angle by the rotational angle sensor 14.

(6) The rotational angle sensor 14 further includes the driving shaft 110 (a rotational member) configured to rotate integrally with the yoke member 15. The yoke member 15 includes the press-fitting recessed portion 150 into which the driving shaft 110 is press-fitted, and the abutment portion 151 against which the tool (another member) abuts when the driving shaft 110 is press-fitted into the press-fitting recessed portion 150. The abutment portion 151 is provided so as not to contact the magnet 16.

Therefore, the abutment portion 151 serves as the pressing surface when the driving shaft 110 is press-fitted into the press-fitting recessed portion 150, which can facilitate the press-fitting process. Further, at the time of the press-fitting process, the damage of the magnet 16 can be prevented or reduced.

(7) The rotational angle sensor 14 further includes the sensor mounting substrate 18 (a magnetic detection member mounting substrate) provided in the inner side in the radial direction with respect to the magnet 16 and provided so as to overlap the magnet 16 in the direction along the driving shaft 110. The sensor mounting substrate 18 has the magnetic detection elements 142 and 143 and the magnetic detection elements 144 and 145 mounted thereon.

Therefore, the magnetic detection elements 142 and 143 and the magnetic detection elements 144 and 145 can be disposed in the inner peripheral side of the magnet 16 with the magnetic detection elements 142 and 143 and the magnetic detection elements 144 and 145 mounted on the sensor mounting substrate 18.

(8) The magnetic detection elements 142 and 143 are mounted in the first magnetic sensor chip 140 (a first sensor chip). The magnetic detection elements 144 and 145 are mounted in the second magnetic sensor chip 141 (a second sensor chip) different from the first magnetic sensor chip 140. The first magnetic sensor chip 140 is mounted on the one side of the sensor mounting substrate 18. The second magnetic sensor chip 141 is mounted on the other side of the sensor mounting substrate 18.

Therefore, the first magnetic sensor chip 140 and the second magnetic sensor chip 141 can be easily mounted on the sensor mounting substrate 18 while being disposed on the same rotational axis.

(9) The sensor mounting substrate 18 is formed into the substantially circular shape extending around the rotational axis.

Therefore, the first embodiment can achieve the increase in the area of the sensor mounting substrate 18 where the elements are mounted while preventing the interference between the sensor mounting substrate 18 and the magnet 16.

(10) The rotational angle sensor 14 further includes the substrate 19 (a large substrate) provided so as to face the sensor mounting substrate 18 in the direction along the rotational axis and having the central processing unit 120 (a microcomputer) mounted thereon, and the support member 20 (an insulating support member) made from the insulating material and supporting the sensor mounting substrate 18 in the state spaced apart from the substrate 19.

Therefore, the first embodiment can stably hold the sensor mounting substrate 18.

(11) The support member 20 includes the positioning pin 200 that positions the support member 20 relative to the substrate 19.

Therefore, the first embodiment can improve an accuracy of the relative position between the magnetic detection elements 142 and 143 and the magnetic detection elements 144 and 145 and the magnet 16.

(12) The magnetic detection elements 142 and 143 and the magnetic detection elements 144 and 145 are provided so as to overlap the magnet 16 in the direction along the rotational axis.

Therefore, the first embodiment can improve the accuracy with which the rotational angle of the electric motor 11 is detected.

(13) The magnet 16 is prepared as an annular magnet.

Therefore, the first embodiment can prevent or reduce the influence from the external magnetic field on the magnetic detection elements 142 and 143 and the magnetic detection elements 144 and 145.

(14) The magnet 16 includes a plurality of magnets provided in the direction extending around the rotational axis.

Therefore, the first embodiment allows the magnet 16 to surround the peripheries of the magnetic detection elements 142 and 143 and the magnetic detection elements 144 and 145 without complicating the shape of the magnet 16.

(15) The power steering apparatus includes the steering mechanism 4 configured to turn the turning target wheel 10 according to the steering operation performed on a steering wheel 2, the electric motor 11 configured to supply the steering force to the steering mechanism 4, the rotational angle sensor 14 (an angle detector) configured to detect the angle of the driving shaft 110 (an output shaft) of the electric motor 11, and the central processing unit 120 (a controller) configured to control the driving of the electric motor 11 based on the signal output from the rotational angle sensor 14. The rotational angle sensor 14 includes the magnetic detection elements 142 and 143 (a first magnetic detection portion) provided on the rotational axis and configured to detect the change in the magnitude or the direction of the magnetic field, and the magnetic detection elements 144 and 145 (a second magnetic detection portion) provided on the rotational axis and disposed at the position offset from the magnetic detection elements 142 and 143 (the first magnetic detection portion) in the direction along the rotational axis. The magnetic detection elements 144 and 145 are configured to detect the change in the magnitude or the direction of the magnetic field. The rotational angle sensor 14 further includes the magnet 16 provided at the driving shaft 110 of the electric motor 11 and provided on the outer side in the radial direction of the rotational axis with respect to the magnetic detection elements 142 and 143 and the magnetic detection elements 144 and 145. The magnet 16 is disposed in such a manner that the N-poles and the S-poles face each other around the rotational axis, and is provided rotatably relative to the magnetic detection elements 142 and 143 and the magnetic detection elements 144 and 145. The rotational angle sensor 14 is configured to detect the rotational angle of the magnet 16 relative to the magnetic detection elements 142 and 143 and the magnetic detection elements 144 and 145 based on the signals output from the magnetic detection elements 142 and 143 and the magnetic detection elements 144 and 145.

Therefore, the first embodiment allows both the magnetic detection elements 142 and 143 and the magnetic detection elements 144 and 145 to exhibit the uniform output characteristics.

Second Embodiment

A second embodiment will be described. The second embodiment is different from the first embodiment in terms of the configuration of the yoke member 15 and the configuration of the magnet 16. The second embodiment will be described, identifying similar configurations to the first embodiment by the same reference numerals and omitting descriptions thereof.

Figure 6:
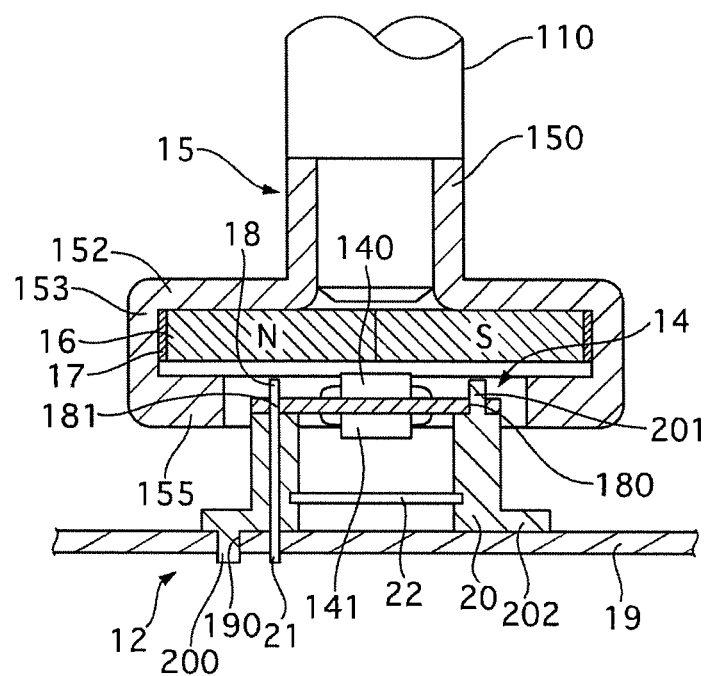
FIG. 6 schematically illustrates a configuration of the rotational angle sensor according to a second embodiment.

FIG. 6 schematically illustrates a configuration of the rotational angle sensor 14. The increased diameter portion 152 is formed so as to extend from the press-fitting recessed portion 150 of the yoke member 15 outwardly in the radial direction. The magnet holding portion 153 is formed so as to extend from the outermost portion of the increased diameter portion 152 in the radial direction toward the other end side in the axial direction. The magnet 16, which is shaped like a disk, is held on the inner peripheral side of the magnet holding portion 153. The magnet 16 is fixed to the magnet holding portion 153 with use of the elastic adhesive agent 17. A flange portion 155 is formed so as to extend inwardly in the radial direction from a distal end of the magnet holding portion 153 in the axial direction.

[Functions]

In the second embodiment, the flange portion 155 is formed at the yoke member 15 so as to extend inwardly in the radial direction from the distal end of the magnet holding portion 153 in the axial direction. As a result, the magnetic field is generated so as to enclose the magnet 16 while passing through the flange portion 155, which can improve the accuracy of the magnetic detection by the first magnetic sensor chip 140 and the second magnetic sensor chip 141.

[Advantageous Effects]

(16) The yoke member 15 is equipped with the flange portion 155 provided on the one side or the other side of the magnet 16 in the direction along the rotational axis and extending inwardly in the radial direction.

Therefore, the second embodiment can improve the accuracy of the magnetic detection by the magnetic detection elements 142 and 143 and the magnetic detection elements 144 and 145.

Third Embodiment

A third embodiment will be described. The third embodiment is different from the first embodiment in terms of the configuration of the yoke member 15 and the configuration of the magnet 16. The third embodiment will be described, identifying similar configurations to the first embodiment by the same reference numerals and omitting descriptions thereof.

Figure 7:
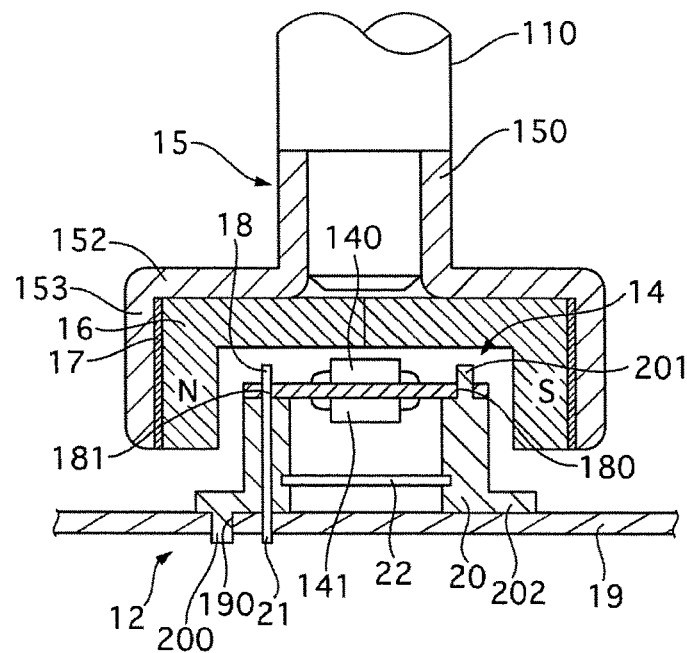
FIG. 7 schematically illustrates a configuration of the rotational angle sensor according to a third embodiment.

FIG. 7 schematically illustrates a configuration of the rotational angle sensor 14. The increased diameter portion 152 is formed so as to extend outwardly in the radial direction from the press-fitting recessed portion 150 of the yoke member 15. The magnet holding portion 153 is formed so as to extend from the outermost portion of the increased diameter portion 152 in the radial direction toward the other end side in the axial direction. The magnet 16 is held on the inner peripheral side of the magnet holding portion 153. The magnet 16, which is shaped like a disk, is formed into a cup-like shape, and is disposed in such a manner that a bottom portion thereof is located on the increased diameter portion 512 side and an opening portion thereof is located on the other side closer to the first magnetic sensor chip 140 and the second magnetic sensor chip 141. The magnet 16 includes a connection portion 160 formed so as to extend in the radial direction with respect to the rotational axis and connecting the N-poles and the S-poles.

[Functions]

In the third embodiment, the magnet 16 is configured to include the connection portion 160 formed so as to extend in the radial direction with respect to the rotational axis and connecting the N-poles and the S-poles. As a result, the magnet 16 can also be provided at a position facing the first magnetic sensor chip 140 and the second magnetic sensor chip 141 in the direction along the rotational axis. Therefore, the third embodiment can enhance the magnetic field applied to the first magnetic sensor chip 140 and the second magnetic sensor chip 141, and also prevent or reduce the influence of the magnetic field that is applied from outside in the direction along the rotational axis onto the first magnetic sensor chip 140 and the second magnetic sensor chip 141.

[Advantageous Effects]

(17) The magnet 16 includes the connection portion 160 formed so as to extend in the radial direction with respect to the rotational axis and connecting the N-poles and the S-poles.

Therefore, the third embodiment can enhance the magnetic field applied to the magnetic detection elements 142 and 143 and the magnetic detection elements 144 and 145, and also prevent or reduce the influence of the magnetic field that is applied from outside in the direction along the rotational axis onto the magnetic detection elements 142 and 143 and the magnetic detection elements 144 and 145.

Fourth Embodiment

A fourth embodiment will be described. The fourth embodiment is different from the first embodiment in terms of the method for supporting the sensor mounting substrate 18 on the substrate 19. The fourth embodiment will be described, identifying similar configurations to the first embodiment by the same reference numerals and omitting descriptions thereof.

Figure 8:
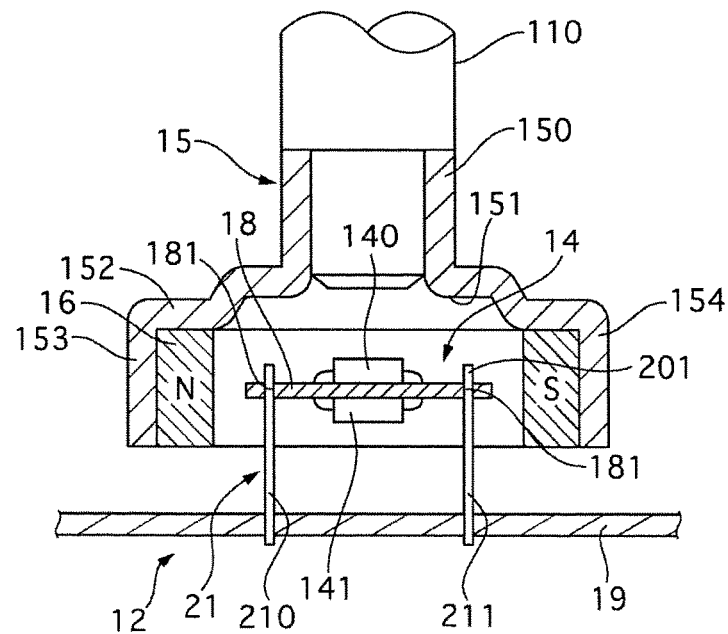
FIG. 8 schematically illustrates a configuration of the rotational angle sensor according to a fourth embodiment.

FIG. 8 schematically illustrates a configuration of the rotational angle sensor 14. The fourth embodiment does not include the support member 20 and is configured in such a manner that the sensor mounting substrate 18 is supported while being spaced apart from the substrate 19 via a first bus bar 210 electrically connecting the first magnetic sensor chip 140 and the substrate 19 to each other, and a second bus bar 211 electrically connecting the second magnetic sensor chip 141 and the substrate 19 to each other.

[Functions]

The fourth embodiment is configured in such a manner that the sensor mounting substrate 18 is supported while being spaced apart from the substrate 19 by the first bus bars 210 and the second bas bars 211. As a result, the bus bars 21 also serve as the support member of the sensor mounting substrate 18, which can achieve a reduction in the number of parts.

[Advantageous Effects]

(18) The rotational angle sensor 14 includes the substrate 19 provided so as to face the sensor mounting substrate 18 in the direction along the rotational axis and having the central processing unit 120 mounted thereon. The magnetic detection elements 142 and 143 are mounted in the first magnetic sensor chip 140. The magnetic detection elements 144 and 145 are mounted in the second magnetic sensor chip 141 different from the first magnetic sensor chip 140. The first magnetic sensor chip 140 is made from the conductive metallic material and is configured to output the signals output from the magnetic detection elements 142 and 143 to the central processing unit 120. The first magnetic sensor chip 140 includes the first bus bar 210 (a first support member) supporting the sensor mounting substrate 18 in the state spaced apart from the substrate 19. The second magnetic sensor chip 141 is made from the conductive metallic material and is configured to output the signals output from the magnetic detection elements 144 and 145 to the central processing unit 120. The second magnetic sensor chip 141 includes the second bus bar 211 (a second support member) supporting the sensor mounting substrate 18 in the state spaced apart from the substrate 19.

Therefore, the bus bars 21 also serve as the support member of the sensor mounting substrate 18, which can achieve the reduction in the number of parts.

Fifth Embodiment

A fifth embodiment will be described. The fifth embodiment is different from the first embodiment in terms of the method for supporting the sensor mounting substrate 18 on the substrate 19. The fourth embodiment will be described, identifying similar configurations to the first embodiment by the same reference numerals and omitting descriptions thereof.

Figure 9:
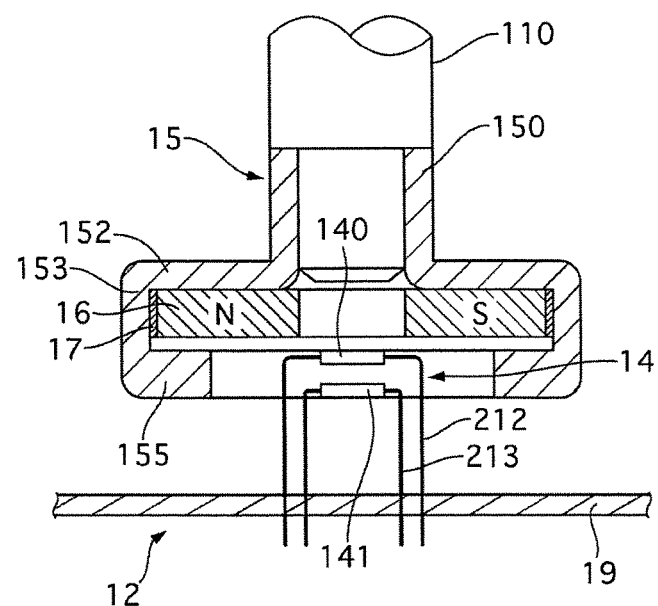
FIG. 9 schematically illustrates a configuration of the rotational angle sensor according to a fifth embodiment.

FIG. 9 schematically illustrates a configuration of the rotational angle sensor 14. The increased diameter portion 152 is formed so as to extend outwardly in the radial direction from the press-fitting recessed portion 150 of the yoke member 15. The magnet holding portion 153 is formed so as to extend from the outermost portion of the increased diameter portion 152 in the radial direction toward the other end side in the axial direction. The magnet 16, which is shaped like a ring, is held on the inner peripheral side of the magnet holding portion 153. The magnet 16 is fixed to the magnet holding portion 153 with use of the elastic adhesive agent 17. The flange portion 155 is formed so as to extend inwardly in the radial direction from the distal end of the magnet holding portion 153 in the axial direction.

The first magnetic sensor chip 140 is connected to the substrate 19 via a terminal 212 directly installed at the first magnetic sensor chip 140. The first magnetic sensor chip 140 is supported in a state spaced apart from the substrate 19 by the terminal 212. The second magnetic sensor chip 141 is connected to the substrate 19 via a terminal 213 directly installed at the second magnetic sensor chip 141. The second magnetic sensor chip 141 is supported in a state spaced apart from the substrate 19 by the terminal 213.

[Functions]

In the fifth embodiment, the first magnetic sensor chip 140 is supported while being spaced apart from the substrate 19 by the terminal 212 directly installed at the first magnetic sensor chip 140. Further, the second magnetic sensor chip 141 is supported while being spaced apart from the substrate 19 by the terminal 213 directly installed at the second magnetic sensor chip 141. As a result, the fifth embodiment allows the first magnetic sensor chip 140 and the second magnetic sensor chip 141 to be supported directly on the substrate 19, and allows the terminals 212 and 213 to also serve as support members of the first magnetic sensor chip 140 and the second magnetic sensor chip 141, respectively, thereby succeeding in a reduction in the number of parts.

[Advantageous Effects]

(19) The rotational angle sensor 14 includes the substrate 19 provided so as to face the magnetic detection elements 142 and 143 and the magnetic detection elements 144 and 145 in the direction along the rotational axis and having the central processing unit 120 mounted thereon. The magnetic detection elements 142 and 143 are mounted in the first magnetic sensor chip 140. The magnetic detection elements 144 and 145 are mounted in the second magnetic sensor chip 141 different from the first magnetic sensor chip 140. The first magnetic sensor chip 140 and the second magnetic sensor chip 141 are each made from the conductive metallic material and are configured to output the signals output from the magnetic detection elements 142 and 143 and the magnetic detection elements 144 and 145 to the central processing unit 120, respectively. The first magnetic sensor chip 140 and the second magnetic sensor chip 141 include the terminals 212 and 213 (a sensor chip support member) supporting the first magnetic sensor chip 140 and the second magnetic sensor chip 141 in the state spaced apart from the substrate 19, respectively.

Therefore, the terminals 212 and 213 also serve as the support members of the first magnetic sensor chip 140 and the second magnetic sensor chip 141, respectively, which can achieve the reduction in the number of parts.

Sixth Embodiment

Figure 10:
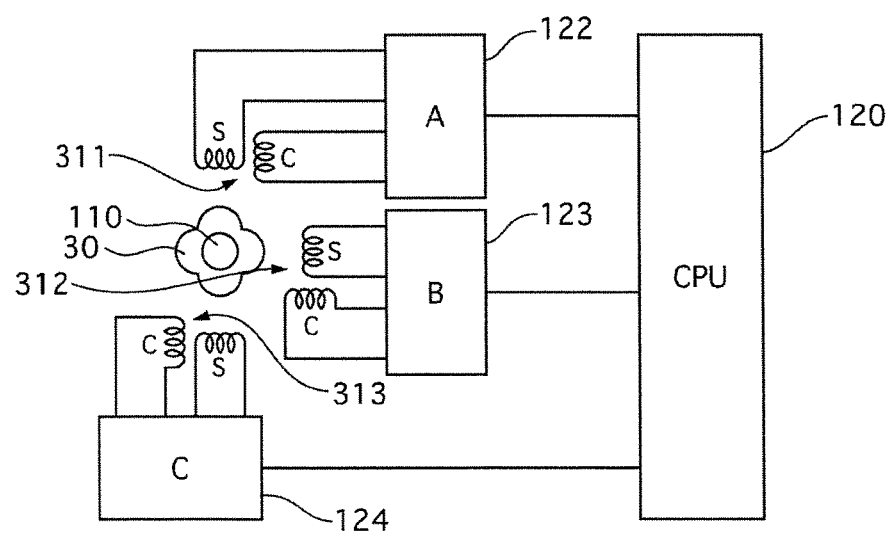
FIG. 10 schematically illustrates a configuration of the rotational angle sensor 14 according to a sixth embodiment.
Figure 11:
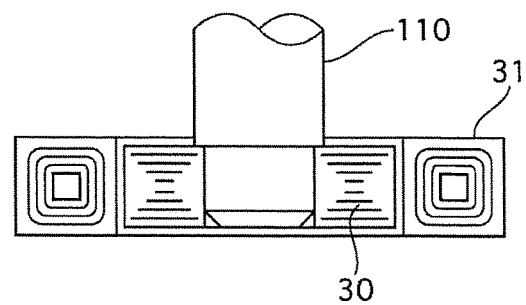
FIG. 11 is a schematic cross-sectional view of a sensor rotor and a sensor stator according to the sixth embodiment.
Figure 12:
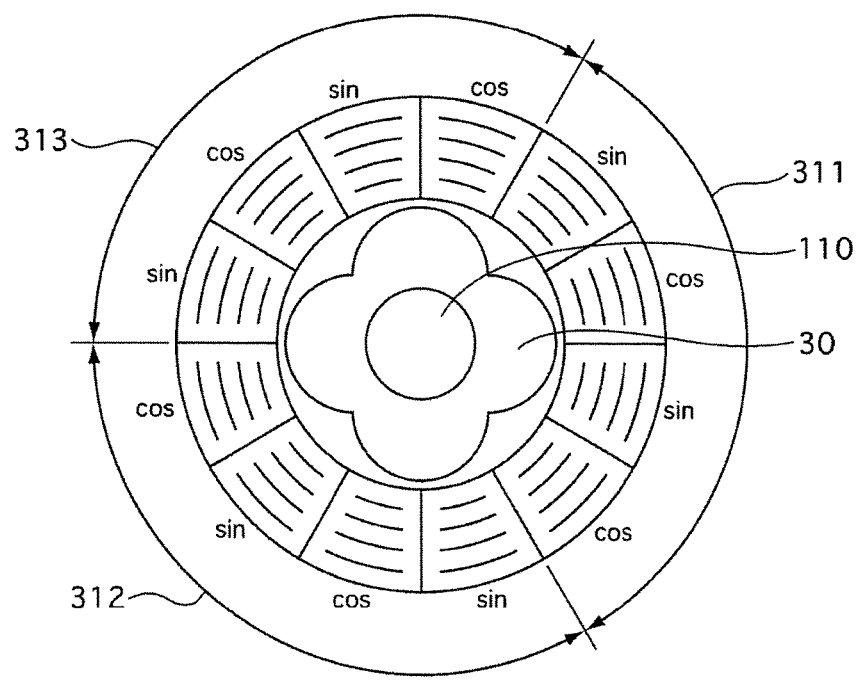
FIG. 12 schematically illustrates the sensor rotor and the sensor stator according to the sixth embodiment as viewed from the axial direction.

A sixth embodiment will be described. The sixth embodiment is different in terms of the configuration of the rotational angle sensor 14. FIG. 10 schematically illustrates the configuration of the rotational angle sensor 14. FIG. 11 is a schematic cross-sectional view of a sensor rotor 30 and a sensor stator 31. FIG. 12 schematically illustrates the sensor rotor 30 and the sensor stator 31 as viewed from the axial direction.

The sensor rotor 30 is fixed integrally rotatably with the driving shaft 10 of the electric motor 11. The sensor rotor 30 is made of a magnetic body. An outer periphery of the sensor rotor 30 is formed in such a manner that a distance (an outer diameter) to the rotational axis of the driving shaft 110 periodically changes in a direction extending around the rotational axis.

The sensor stator 31 is disposed around the outer periphery of the sensor rotor 30. The sensor rotor 30 is formed by a plurality of coils. The sensor stator 31 includes three magnetic field detection portions 311, 312, and 313. Each of the magnetic field detection portions 311, 312, and 313 is formed by four coils (FIG. 12). In other words, the sensor stator 31 is formed by twelve coils. The twelve coils include sine signal detection coils that each detect a sine signal and cosine signal detection coils that each detect a cosine signal, and are formed into a cylindrical shape as a whole with the sine signal detection coils and the cosine signal detection coils alternately disposed thereon.

Magnetic field change signals detected by the individual magnetic field detection portions 311, 312, and 313 are input to calculation circuits 122, 123, and 124, respectively. Each of the calculation circuits 122, 123, and 124 individually calculates a rotational angle of the sensor rotor 30, and outputs a result of the calculation to the central processing unit 120.

[Functions]

The sixth embodiment is configured to detect the change in the magnetic field according to the rotation of the sensor rotor 30 with use of the magnetic field detection portions 311, 312, and 313 disposed around the outer periphery of the sensor rotor 30. Then, the sixth embodiment is configured to detect the rotational angle of the sensor rotor 30 from the change in the magnetic field that is detected by each of the magnetic field detection portions 311, 312, and 313. As a result, the magnetic field detection portions 311, 312, and 313 can detect the respective magnetic fields under environments equal to one another, which allows the magnetic field detection portions 311, 312, and 313 to exhibit uniform output characteristics.

[Advantageous Effects]

(20) The rotational angle sensor 14 (a rotational angle detection apparatus), which is configured to detect the rotational angle of the electric motor 11 (a rotational body), includes the sensor rotor 30 provided at the electric motor 11 and serving as the detection target portion made from the magnetic material. The sensor rotor 30 is formed in such a manner that the outer diameter thereof, which is the distance between the outer peripheral edge of the detection target portion and the rotational axis of the rotational body, periodically changes in the direction extending around the rotational axis. The rotational angle sensor 14 further includes the magnetic field detection portion 311 (a first detection portion) provided on the outer peripheral side of the sensor rotor 30 and configured to detect the strength of the magnetic field, and the magnetic field detection portion 312 (a second detection portion) provided on the outer peripheral side of the sensor rotor 30 and configured to detect the strength of the magnetic field. The rotational angle sensor 14 is configured to detect the rotational angle of the sensor rotor 30 relative to the magnetic field detection portion 311 and the magnetic field detection portion 312 by detecting the change in the strength of the magnetic field according to the change in the outer diameter periodically changing in the direction extending around the rotational axis based on the signal output from the magnetic field detection portion 311 and the signal output from the magnetic field detection portion 312.

Therefore, the magnetic field detection portions 311, 312, and 313 can detect the respective magnetic fields under environments equal to one another, which allows the magnetic field detection portions 311, 312, and 313 to exhibit the uniform output characteristics.

Other Embodiments

Having described the present invention based on the first to sixth embodiments, the specific configuration of each of the inventions is not limited to the first to sixth embodiments, and the present invention also includes a design modification and the like thereof made within a range that does not depart from the spirit of the present invention.

In the first to fifth embodiments, each of the first magnetic sensor chip 140 and the second magnetic sensor chip 141 is configured as the multi-sensor chip with the two magnetic detection elements mounted thereon, but may be configured as a chip with one magnetic detection element mounted thereon. The first magnetic sensor chip 140 and the second magnetic sensor chip 141 may be any sensor chip that allows at least two or more magnetic detection elements to be provided offset from each other in terms of the rotational axis of the driving shaft 110.

In the sixth embodiment, the magnetic field detection portions 311, 312, and 313 are disposed in the outer peripheral side of the sensor rotor 30, but may be disposed on an inner side in the radial direction with the sensor rotor 30 formed so as to have an inner diameter periodically changing in the direction extending around the rotational axis.

The present invention may also be configured in the following manner.

(1) A rotational angle detection apparatus, which is configured to detect a rotational angle of a rotational body, includes a first magnetic detection portion provided on a rotational axis and configured to detect a change in a magnitude or a direction of a magnetic field, and a second magnetic detection portion provided on the rotational axis and disposed at a position offset from the first magnetic detection portion in a direction along the rotational axis. The second magnetic detection portion is configured to detect the change in the magnitude or the direction of the magnetic field. The rotational angle detection apparatus further includes a magnet provided on an outer side in a radial direction of the rotational axis with respect to the first magnetic detection portion and the second magnetic detection portion and disposed in such a manner that an N-pole and an S-pole face each other around the rotational axis. The magnet is provided rotatably relative to the first magnetic detection portion and the second magnetic detection portion. The rotational angle detection apparatus is configured to detect a rotational angle of the magnet relative to the first magnetic detection portion and the second magnetic detection portion based on signals output from the first magnetic detection portion and the second magnetic detection portion.

In an embodiment according to this configuration (1), both the first magnetic detection portion and the second magnetic detection portion are disposed on the rotational axis of the magnetic field rotating relative to the first and second magnetic detection portions, and therefore this embodiment can improve an accuracy of the detection of the rotational angle by detecting the magnetic field at the center of the rotation and also allow both the first magnetic detection portion and the second magnetic detection portion to exhibit uniform output characteristics by detecting the same magnetic field as each other.

(2) The rotational angle detection apparatus according to the above-described configuration (1) may further include a yoke member provided on an outer side of the magnet in the radial direction and made from a magnetic material.

An embodiment according to this configuration (2) can enhance the magnetic field of the magnet due to the yoke member.

(3) In the rotational angle detection apparatus according to the above-described configuration (2), the yoke member may be formed so as to hold the magnet.

An embodiment according to this configuration (3) allows the yoke member to be also used as a magnet holder, thereby succeeding in a reduction in the number of parts.

(4) The rotational angle detection apparatus according to the above-described configuration (3) may further include an elastic member provided between the magnet and the yoke member.

An embodiment according to this configuration (4) can absorb a difference in a liner expansion coefficient between the magnet and the yoke member by the elastic member.

(5) In the rotational angle detection apparatus according to the above-described configuration (3), the yoke member may include a rotation regulation portion configured to regulate a rotation of the magnet relative to the yoke member.

An embodiment according to this configuration (5) can regulate the rotation of the magnet relative to the yoke member, thereby preventing or reducing deterioration of the accuracy of the detection of the rotational angle.

(6) The rotational angle detection apparatus according to the above-described configuration (3) may further include a rotational member configured to rotate integrally with the yoke member. The yoke member may include a press-fitting recessed portion into which the rotational member is press-fitted, and an abutment portion against which another member abuts when the rotational member is press-fitted into the press-fitting recessed portion. The abutment portion may be provided so as not to contact the magnet.

In an embodiment according to this configuration (6), the abutment surface serves as a pressing surface when the rotational member is press-fitted, which can facilitate a press-fitting process. Further, at the time of the press-fitting process, damage of the magnet can be prevented or reduced.

(7) In the rotational angle detection apparatus according to the above-described configuration (2), the yoke member may include a flange portion provided in one side or another side of the magnet in the direction along the rotational axis and extending inwardly in the radial direction.

In an embodiment according to this configuration (7), the magnetic field is generated so as to enclose the magnet while passing through the flange portion, which can improve the accuracy of the detection by the first and second magnetic detection portions.

(8) The rotational angle detection apparatus according to the above-described configuration (1) may further include a magnetic detection member mounting substrate provided on an inner side in the radial direction with respect to the magnet and provided so as to overlap the magnet in the direction along the rotational axis. The magnetic detection member mounting substrate may have the first magnetic detection portion and the second magnetic detection portion mounted thereon.

In an embodiment according to this configuration (8), the substrate is provided in the magnet, which allows the first and second magnetic detection portions to be mounted on the substrate while being disposed in the magnet.

(9) In the rotational angle detection apparatus according to the above-described configuration (8), the first magnetic detection portion may be mounted in a first sensor chip. The second magnetic detection portion may be mounted in a second sensor chip different from the first sensor chip. The first sensor chip may be mounted on one side of the magnetic detection member mounting substrate. The second sensor chip may be mounted on another side of the magnetic detection member mounting substrate.

An embodiment according to this configuration (9) allows the first and second magnetic sensor chips to be easily mounted on the substrate while being disposed on the same rotational axis.

(10) In the rotational angle detection apparatus according to the above-described configuration (8), the magnetic detection member mounting substrate may be formed into a substantially circular shape extending around the rotational axis.

An embodiment according to this configuration (10) can achieve an increase in an area of the substrate where the elements are mounted while preventing interference between the substrate and the magnet.

(11) The rotational angle detection apparatus according to the above-described configuration (8) may further include a large substrate provided so as to face the magnetic detection member mounting substrate in the direction along the rotational axis and having a microcomputer mounted thereon. The first magnetic detection portion may be mounted in a first sensor chip. The second magnetic detection portion may be mounted in a second sensor chip different from the first sensor chip. The first sensor chip may be made from a conductive metallic material and may be configured to output a signal output from the first magnetic detection portion to the microcomputer. The first sensor chip may include a first support member supporting the magnetic detection member mounting substrate in a state spaced apart from the large substrate. The second sensor chip may be made from a conductive metallic material and may be configured to output a signal output from the second magnetic detection portion to the microcomputer. The second sensor chip may include a second support member supporting the magnetic detection member mounting substrate in a state spaced apart from the large substrate.

An embodiment according to this configuration (11) allows the signal line to be also used as a member supporting the magnetic detection member mounting substrate, thereby succeeding in a reduction in the number of parts.

(12) The rotational angle detection apparatus according to the above-described configuration (8) may further include a large substrate provided so as to face the magnetic detection member mounting substrate in the direction along the rotational axis and having a microcomputer mounted thereon, and an insulating support member made from an insulating material and supporting the magnetic detection member mounting substrate in a state spaced apart from the large substrate.

An embodiment according to this configuration (12) can hold the magnetic detection member mounting substrate in a stable state.

(13) In the rotational angle detection apparatus according to the above-described configuration (12), the insulating support member may include a positioning portion configured to position the insulating support member relative to the large substrate.

An embodiment according to this configuration (13) can improve an accuracy of the relative position between the first and second magnetic detection members and the magnet by positioning the insulating support member relative to the large substrate.

(14) In the rotational angle detection apparatus according to the above-described configuration (1), the first magnetic detection portion and the second magnetic detection portion may be provided so as to overlap the magnet in the direction along the rotational axis.

An embodiment according to this configuration (14) allows the first magnetic detection portion and the second magnetic detection portion to be disposed in a range where a strong magnetic field is generated between the N-pole and the S-pole of the magnet, thereby succeeding in improving the accuracy of the detection of the rotational angle.

(15) The rotational angle detection apparatus according to the above-described configuration (1) may further include a large substrate provided so as to face the first magnetic detection portion and the second magnetic detection portion in the direction along the rotational axis and having a microcomputer mounted thereon. The first magnetic detection portion and the second magnetic detection portion may be mounted in a same multi-sensor chip. The multi-sensor chip may include a sensor chip support member that is made from a conductive metallic material and that is configured to output signals output from the first magnetic detection portion and the second magnetic detection portion to the microcomputer. The sensor chip support member may support the multi-sensor chip in a state spaced apart from the large substrate.

An embodiment according to this configuration (15) allows the signal line to be also used as a member supporting the multi-sensor chip, thereby succeeding in a reduction in the number of parts.

(16) In the rotational angle detection apparatus according to the above-described configuration (1), the magnet may be an annular magnet.

An embodiment according to this configuration (16) can prevent or reduce an influence of an external magnetic field on the first and second magnetic detection portions by surrounding the first and second magnetic detection portions over entire circumferences thereof.

(17) In the rotational angle detection apparatus according to the above-described configuration (1), the magnet may include a connection portion formed so as to extend in the radial direction with respect to the rotational axis, the connection portion connecting the N-pole and the S-pole.

An embodiment according to this configuration (17) can enhance the magnetic field, and also prevent or reduce the influence of the external magnetic field from the axial side by including the magnet not only from the outer side of the first and second magnetic detection portions in the radial direction but also at the position facing the first and second magnetic detection portions

(18) In the rotational angle detection apparatus according to the above-described configuration (1), a plurality of magnets may be provided in a direction extending around the rotational axis.

An embodiment according to this configuration (18) allows the magnet to surround peripheries of the first and second magnetic detection portions without complicating the shape of the magnet.

(19) A rotational angle detection apparatus, which is configured to detect a rotational angle of a rotational body, includes a sensor rotor provided at the rotational body and serving as a detection target portion made from a magnetic material. The sensor rotor is formed in such a manner that an outer diameter thereof, which is a distance between an outer peripheral edge of the detection target portion and a rotational axis of the rotational body, or an inner diameter, which is a distance between an inner peripheral edge of the detection target portion and the rotational axis of the rotational body, periodically changes in a direction extending around the rotational axis. The rotational angle detection apparatus further includes a first detection portion provided in an inner peripheral side or an outer peripheral side of the sensor rotor and configured to detect a strength of a magnetic field, and a second detection portion provided in a same side as one of the inner peripheral side and the outer peripheral side of the sensor rotor where the first detection portion is provided and configured to detect the strength of the magnetic field. The rotational angle detection apparatus is configured to detect a rotational angle of the sensor rotor relative to the first detection portion and the second detection portion by detecting a change in the strength of the magnetic field according to the change in the outer diameter or the inner diameter periodically changing in the direction extending around the rotational axis based on a signal output from the first detection portion and a signal output from the second detection portion.

An embodiment according to this configuration (19) allows the first detection portion and the second detection portion to detect the respective magnetic fields under environments equal to each other, thereby allowing the first detection portion and the second detection portion to exhibit uniform output characteristics.

(20) A power steering apparatus includes a steering mechanism configured to turn a turning target wheel according to a steering operation performed on a steering wheel, an electric motor configured to supply a steering force to the steering mechanism, an angle detector configured to detect an angle of an output shaft of the electric motor, and a controller configured to control driving of the electric motor based on a signal output from the angle detector. The angle detector includes a first magnetic detection portion provided on a rotational axis and configured to detect a change in a magnitude or a direction of a magnetic field, and a second magnetic detection portion provided on the rotational axis and disposed at a position offset from the first magnetic detection portion in a direction along the rotational axis. The second magnetic detection portion is configured to detect the change in the magnitude or the direction of the magnetic field. The rotational angle detection apparatus further includes a magnet provided at an output shaft of the electric motor and disposed in an outer side in a radial direction of the rotational axis with respect to the first magnetic detection portion and the second magnetic detection portion. The magnet is disposed in such a manner that an N-pole and an S-pole face each other around the rotational axis, and is provided rotatably relative to the first magnetic detection portion and the second magnetic detection portion. The rotational angle detection apparatus is configured to detect a rotational angle of the magnet relative to the first magnetic detection portion and the second magnetic detection portion based on signals output from the first magnetic detection portion and the second magnetic detection portion.

In an embodiment according to this configuration (20), both the first magnetic detection portion and the second magnetic detection portion are disposed on the rotational axis of the magnetic field rotating relative to the first and second magnetic detection portions, and therefore this embodiment can improve an accuracy of the detection of the rotational angle by detecting the magnetic field at the center of the rotation and also allow both the first magnetic detection portion and the second magnetic detection portion to exhibit uniform output characteristics by detecting the same magnetic field as each other.

Having described merely several embodiments of the present invention, those skilled in the art will be able to easily understand that the embodiments described as the examples can be modified or improved in various manners without substantially departing from the novel teachings and advantages of the present invention. Therefore, such modified or improved embodiments are intended to be also contained in the technical scope of the present invention. The above-described embodiments may also be arbitrarily combined.

The present application claims priority under the Paris Convention to Japanese Patent Application No. 2014-254425 filed on Dec. 16, 2014. The entire disclosure of Japanese Patent Application No. 2014-254425 filed on Dec. 16, 2014 including the specification, the claims, the drawings, and the abstract is incorporated herein by reference in its entirety.

REFERENCE SIGNS LIST 11 electric motor (rotational body)
14 rotational angle sensor (rotational angle detection apparatus)
15 yoke member
16 magnet
17 adhesive agent (elastic member)
18 sensor mounting substrate (magnetic detection member mounting substrate)
19 substrate (large substrate)
20 support member (insulating support member)
110 driving shaft (rotational member)
120 central processing unit (microcomputer)
140 first magnetic sensor chip (first sensor chip)
141 second magnetic sensor chip (second sensor chip)
142 magnetic detection element (first magnetic detection portion)

143 magnetic detection element (first magnetic detection portion)
144 magnetic detection element (second magnetic detection portion)
145 magnetic detection element (second magnetic detection portion)
150 press-fitting recessed portion
151 abutment portion
210 first bus bar (first support member)
211 second bus bar (second support member)
212 terminal (sensor chip support member)
213 terminal (sensor chip support member)

The invention claimed is:

1. A rotational angle detection apparatus configured to detect a rotational angle of a rotational body, the rotational angle detection apparatus comprising:
a first magnetic detection portion provided on a rotational axis, the first magnetic detection portion being configured to detect a change in a magnitude or a direction of a magnetic field;
a second magnetic detection portion provided on the rotational axis and disposed at a position offset from the first magnetic detection portion in a direction along the rotational axis, the second magnetic detection portion being configured to detect the change in the magnitude or the direction of the magnetic field;
a magnet provided in an outer side in a radial direction of the rotational axis with respect to the first magnetic detection portion and the second magnetic detection portion and disposed in such a manner that an N-pole and an S-pole face each other around the rotational axis, the magnet being provided rotatably relative to the first magnetic detection portion and the second magnetic detection portion,
wherein the rotational angle detection apparatus detects a rotational angle of the magnet relative to the first magnetic detection portion and the second magnetic detection portion based on signals output from the first magnetic detection portion and the second magnetic detection portion.

2. The rotational angle detection apparatus according to claim 1, further comprising a yoke member provided in an outer side of the magnet in the radial direction and made from a magnetic material.

3. The rotational angle detection apparatus according to claim 2, wherein the yoke member is formed so as to hold the magnet.

4. The rotational angle detection apparatus according to claim 3, further comprising an elastic member provided between the magnet and the yoke member.

5. The rotational angle detection apparatus according to claim 3, wherein the yoke member includes a rotation regulation portion configured to regulate a rotation of the magnet relative to the yoke member.

6. The rotational angle detection apparatus according to claim 3, further comprising a rotational member configured to rotate integrally with the yoke member,
wherein the yoke member includes a press-fitting recessed portion into which the rotational member is press-fitted, and an abutment portion against which another member abuts when the rotational member is press-fitted into the press-fitting recessed portion, and
wherein the abutment portion is provided so as not to contact the magnet.

7. The rotational angle detection apparatus according to claim 2, wherein the yoke member includes a flange portion provided in one side or another side of the magnet in the direction along the rotational axis and extending inwardly in the radial direction.

8. The rotational angle detection apparatus according to claim 1, further comprising a magnetic detection member mounting substrate provided in an inner side in the radial direction with respect to the magnet and provided so as to overlap the magnet in the direction along the rotational axis, the magnetic detection member mounting substrate having the first magnetic detection portion and the second magnetic detection portion mounted thereon.

9. The rotational angle detection apparatus according to claim 8, wherein the first magnetic detection portion is mounted in a first sensor chip,
wherein the second magnetic detection portion is mounted in a second sensor chip different from the first sensor chip,
wherein the first sensor chip is mounted on one side of the magnetic detection member mounting substrate, and
wherein the second sensor chip is mounted on another side of the magnetic detection member mounting substrate.

10. The rotational angle detection apparatus according to claim 8, wherein the magnetic detection member mounting substrate is formed into a substantially circular shape extending around the rotational axis.

11. The rotational angle detection apparatus according to claim 8, further comprising a large substrate provided so as to face the magnetic detection member mounting substrate in the direction along the rotational axis and having a microcomputer mounted thereon,
wherein the first magnetic detection portion is mounted in a first sensor chip,
wherein the second magnetic detection portion is mounted in a second sensor chip different from the first sensor chip,
wherein the first sensor chip is made from a conductive metallic material and is configured to output a signal output from the first magnetic detection portion to the microcomputer, the first sensor chip including a first support member supporting the magnetic detection member mounting substrate in a state spaced apart from the large substrate, and
wherein the second sensor chip is made from a conductive metallic material and is configured to output a signal output from the second magnetic detection portion to the microcomputer, the second sensor chip including a second support member supporting the magnetic detection member mounting substrate in a state spaced apart from the large substrate.

12. The rotational angle detection apparatus according to claim 8, further comprising:
a large substrate provided so as to face the magnetic detection member mounting substrate in the direction along the rotational axis and having a microcomputer mounted thereon; and
an insulating support member made from an insulating material and supporting the magnetic detection member mounting substrate in a state spaced apart from the large substrate.

13. The rotational angle detection apparatus according to claim 12, wherein the insulating support member includes a positioning portion configured to position the insulating support member relative to the large substrate.

14. The rotational angle detection apparatus according to claim 1, wherein the first magnetic detection portion and the second magnetic detection portion are provided so as to overlap the magnet in the direction along the rotational axis.

15. The rotational angle detection apparatus according to claim 1, further comprising a large substrate provided so as to face the first magnetic detection portion and the second magnetic detection portion in the direction along the rotational axis and having a microcomputer mounted thereon,
wherein the first magnetic detection portion and the second magnetic detection portion are mounted in a same multi-sensor chip, and
wherein the multi-sensor chip includes a sensor chip support member that is made from a conductive metallic material and that is configured to output signals output from the first magnetic detection portion and the second magnetic detection portion to the microcomputer, the sensor chip support member supporting the multi-sensor chip in a state spaced apart from the large substrate.

16. The rotational angle detection apparatus according to claim 1, wherein the magnet is an annular magnet.

17. The rotational angle detection apparatus according to claim 1, wherein the magnet includes a connection portion formed so as to extend in the radial direction with respect to the rotational axis, the connection portion connecting the N-pole and the S-pole.

18. The rotational angle detection apparatus according to claim 1, wherein a plurality of magnets are provided in a direction extending around the rotational axis.

19. A rotational angle detection apparatus configured to detect a rotational angle of a rotational body, the rotational angle detection apparatus comprising:
a sensor rotor provided at the rotational body and serving as a detection target portion made from a magnetic material, the sensor rotor being formed in such a manner that an outer diameter thereof, which is a distance between an outer peripheral edge of the detection target portion and a rotational axis of the rotational body, or an inner diameter, which is a distance between an inner peripheral edge of the detection target portion and the rotational axis of the rotational body, periodically changes in a direction extending around the rotational axis;
a first detection portion provided in an inner peripheral side or an outer peripheral side of the sensor rotor and configured to detect a strength of a magnetic field; and
a second detection portion provided in a same side as one of the inner peripheral side and the outer peripheral side of the sensor rotor where the first detection portion is provided, and configured to detect the strength of the magnetic field,
wherein the rotational angle detection apparatus detects a rotational angle of the sensor rotor relative to the first detection portion and the second detection portion by detecting a change in the strength of the magnetic field according to the change in the outer diameter or the inner diameter periodically changing in the direction extending around the rotational axis based on a signal output from the first detection portion and a signal output from the second detection portion.

20. A power steering apparatus comprising:
a steering mechanism configured to turn a turning target wheel according to a steering operation performed on a steering wheel;
an electric motor configured to supply a steering force to the steering mechanism;
an angle detector configured to detect an angle of an output shaft of the electric motor; and
a controller configured to control driving of the electric motor based on a signal output from the angle detector,
wherein the angle detector includes:
a first magnetic detection portion provided on a rotational axis, the first magnetic detection portion being configured to detect a change in a magnitude or a direction of a magnetic field;
a second magnetic detection portion provided on the rotational axis and disposed at a position offset from the first magnetic detection portion in a direction along the rotational axis, the second magnetic detection portion being configured to detect the change in the magnitude or the direction of the magnetic field;
a magnet provided at the output shaft of the electric motor and disposed in an outer side in a radial direction of the rotational axis with respect to the first magnetic detection portion and the second magnetic detection portion, the magnet being disposed in such a manner that an N-pole and an S-pole face each other around the rotational axis, the magnet being provided rotatably relative to the first magnetic detection portion and the second magnetic detection portion,
wherein the angle detector detects a rotational angle of the magnet relative to the first magnetic detection portion and the second magnetic detection portion based on signals output from the first magnetic detection portion and the second magnetic detection portion.

* * * * *